(12) United States Patent
Nakamura

(10) Patent No.: US 10,397,321 B2
(45) Date of Patent: Aug. 27, 2019

(54) INFORMATION PROCESSING APPARATUS THAT PERFORMS SET VALUE SYNCHRONIZATION PROCESS, CONTROL, METHOD THEREFOR, STORAGE MEDIUM STORING CONTROL PROGRAM THEREFOR, AND INFORMATION PROCESSING SYSTEM

(71) Applicant: CANON KABUSHIKI KAISHA, Tokyo (JP)

(72) Inventor: Shun Nakamura, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 297 days.

(21) Appl. No.: 15/189,049

(22) Filed: Jun. 22, 2016

(65) Prior Publication Data
US 2017/0006098 A1 Jan. 5, 2017

(30) Foreign Application Priority Data
Jun. 30, 2015 (JP) .................................. 2015-131173

(51) Int. Cl.
*H04L 29/08* (2006.01)
*H04L 12/26* (2006.01)
(Continued)

(52) U.S. Cl.
CPC .......... *H04L 67/1095* (2013.01); *H04L 12/12* (2013.01); *H04L 41/0813* (2013.01);
(Continued)

(58) Field of Classification Search
CPC ............. H04L 67/1095; H04L 41/0813; H04L 41/0856; H04L 12/12; G06F 3/1285;
(Continued)

(56) References Cited

U.S. PATENT DOCUMENTS

| | | | | |
|---|---|---|---|---|
| 2002/0065950 A1* | 5/2002 | Katz | .................... | H04N 21/235 |
| | | | | 719/318 |
| 2003/0115378 A1* | 6/2003 | Zondervan | ................ | G06F 8/34 |
| | | | | 719/328 |

(Continued)

FOREIGN PATENT DOCUMENTS

| | | |
|---|---|---|
| JP | 2003264662 A | 9/2003 |
| JP | 2006094507 A | 4/2006 |

(Continued)

OTHER PUBLICATIONS

Office Action issued in Japanese Appln. No. 2015-131173 dated Dec. 4, 2018.

*Primary Examiner* — Abdullahi E Salad
(74) *Attorney, Agent, or Firm* — Rossi, Kimms & McDowell LLP

(57) ABSTRACT

An information processing apparatus that is capable of reducing total network traffic without wasting received synchronizing data in the information processing apparatus. A plurality of devices of which energization states are controllable independently perform information processes according to set data. A determination unit determines whether each of the plurality of devices is in an energized state. A request unit requests update information about set data concerning a device that is determined being in the energized state by the determination unit from an external apparatus connected to the information processing apparatus through a network. An update unit performs an update process that updates the set data according to the update information transmitted from the external apparatus in response to the request.

14 Claims, 19 Drawing Sheets

(51) Int. Cl.
*H04L 12/24* (2006.01)
*H04L 12/12* (2006.01)
*G06F 3/12* (2006.01)

(52) U.S. Cl.
CPC ........ *H04L 41/0856* (2013.01); *G06F 3/1203* (2013.01); *G06F 3/1219* (2013.01); *G06F 3/1229* (2013.01); *G06F 3/1257* (2013.01); *G06F 3/1285* (2013.01); *Y02D 50/40* (2018.01)

(58) Field of Classification Search
CPC .... G06F 3/1203; G06F 3/1219; G06F 3/1229; G06F 3/1257; Y02D 50/40
See application file for complete search history.

(56) References Cited

U.S. PATENT DOCUMENTS

| | | | | |
|---|---|---|---|---|
| 2004/0022553 | A1* | 2/2004 | Johnson | G03G 15/5004 399/75 |
| 2005/0135528 | A1* | 6/2005 | Miyamoto | H04L 7/042 375/357 |
| 2007/0300220 | A1* | 12/2007 | Seliger | G06F 8/61 718/1 |
| 2011/0230138 | A1* | 9/2011 | Ohkita | H04W 52/0261 455/41.2 |
| 2012/0233122 | A1* | 9/2012 | Briet | H04L 67/1095 707/634 |
| 2013/0165129 | A1* | 6/2013 | Koren | H04L 67/146 455/440 |
| 2014/0068597 | A1* | 3/2014 | Hirahara | G06F 8/65 717/173 |
| 2015/0103711 | A1* | 4/2015 | Hong | H04W 52/0206 370/311 |
| 2015/0277801 | A1* | 10/2015 | Konishi | G06F 3/0625 711/114 |
| 2015/0326662 | A1* | 11/2015 | Shibata | H04L 67/1095 714/18 |
| 2016/0179393 | A1* | 6/2016 | Masuda | G06F 3/065 711/165 |
| 2016/0353516 | A1* | 12/2016 | Rajurkar | H04W 8/183 |
| 2017/0013562 | A1* | 1/2017 | Lim | H04M 1/725 |

FOREIGN PATENT DOCUMENTS

| | | |
|---|---|---|
| JP | 2007267235 A | 10/2007 |
| JP | 2010173318 A | 8/2010 |
| JP | 2010283618 A | 12/2010 |
| JP | 2012181690 A | 9/2012 |
| JP | 2013062592 A | 4/2013 |
| JP | 2013248858 A | 12/2013 |
| JP | 2015076749 A | 4/2015 |

* cited by examiner

FIG. 8

| KEY IDENTIFIER | UI DISPLAY TEXT | INITIAL VALUE | RANGE | APPLICABLE MODEL/ FIRM VERSION | DISPLAY CONDITION | SYNC TARGET | MANAGEMENT CONTROLLER |
|---|---|---|---|---|---|---|---|
| settings.pattern | PATTERN PRINT | 0 | 0-1 | MODEL A/ALL MODEL B/ALL MODEL C/ V3.01 OR LATER | PATTERN LICENSE | LIMITED | PRINTER |
| settings.density | DENSITY | 5 | 0-10 | MODEL A/ALL MODEL B/2.01 OR LATER | — | UNLIMITED | PRINTER |
| settings.device_sirial | SERIAL ID | " " | STRING | ALL | — | LIMITED | INFORMATION PROCESS |
| settings.copy_cur_page | NO DISPLAY (PAGE NUMBER OF COPYING) | 0 | 0-999 99 | ALL | — | LIMITED | SCANNER |
| settings.sleep_time | SLEEP TIME | 0 | 0-144 00 | ALL | — | UNLIMITED | INFORMATION PROCESS |
| settings.dns_address | DNS SERVER ADDRESS | " " | STRING | ALL | — | UNLIMITED | INFORMATION PROCESS |
| ... | | | | | | | |

FIG. 9

| KEY IDENTIFIER | VALUE | LAST UPDATE TIME | SYNC TARGET | MANAGEMENT CONTROLLER |
|---|---|---|---|---|
| settings.density | 0 | 2013/9/9/12:01 | UNLIMITED | PRINTER |
| settings.sleep_time | 3600 | 2013/9/8/17:35 | UNLIMITED | INFORMATION PROCESS |
| ... | | | | |

FIG. 10

| KEY IDENTIFIER | VALUE | LAST UPDATE TIME | SYNC TARGET | MANAGEMENT CONTROLLER |
|---|---|---|---|---|
| settings.pattern | 1 | 2013/5/9/18:42 | LIMITED | PRINTER |
| settings.device_serial | "WXYZ12ABC" | 2013/6/18/17:12 | LIMITED | INFORMATION PROCESS |
| settings.copy_cur_page | 66 | 2013/9/9/13:25 | LIMITED | SCANNER |
| settings.dns_address | "xxx.xxx.xxx.xxx" | 2013/6/18/17:44 | UNLIMITED | INFORMATION PROCESS |
| ... | | | | |

FIG. 11

| ATTRIBUTE | VALUE |
|---|---|
| INDIVIDUAL IDENTIFIER | INDIVIDUAL 1 |
| MODEL NAME | MODEL A |
| FIRM VERSION | 0.01 |
| INSTALLED LICENSE | PATTERN LICENSE |
| ACCESSARY | Finisher-X |

FIG. 12

| USER ID | USER NAME | FIRST NAME | LAST NAME |
|---|---|---|---|
| 501 | sato | TAKASHI | SATO |
| 502 | ii | RYOKO | II |
| ... | | | |

FIG. 13

| USER ID | KEY IDENTIFIER | VALUE | LAST UPDATE TIME |
|---|---|---|---|
| 501 | preference.print_setting1 | {colormode: "BW", copies :"3"} | 2013/2/4/2:01 |
| 501 | preference.print_setting2 | {colormode: "CL,quality : "low"} | 2013/2/3/7:35 |
| 501 | preference.address1 | {destination: "sato@conon.com"} | 2013/8/30/3:01 |
| 501 | preference.address2 | {destination: "user1@conon.com"} | 2013/1/13/2:16 |
| ... | | | |

FIG. 16

| KEY IDENTIFIER | VALUE | UI DISPLAY TEXT | INITIAL VALUE | RANGE | APPLICABLE MODEL/ FIRM VERSION | DISPLAY CONDITION | SYNC TARGET | MANAGEMENT CONTROLLER |
|---|---|---|---|---|---|---|---|---|
| settings.device_sirial | " " | SERIAL ID | " " | STRING | ALL | — | LIMITED | INFORMATION PROCESS |
| settings.sleep_time | 0 | SLEEP TIME | 0 | 0-14400 | ALL | | UNLIMITED | INFORMATION PROCESS |
| settings.dns_address | " " | DNS SERVER ADDRESS | " " | STRING | ALL | — | LIMITED | INFORMATION PROCESS |
| ... | | | | | | | | |

FIG. 17

| KEY IDENTIFIER | VALUE | UI DISPLAY TEXT | INITIAL VALUE | RANGE | APPLICABLE MODEL/ FIRM VERSION | DISPLAY CONDITION | SYNC TARGET | MANAGEMENT CONTROLLER |
|---|---|---|---|---|---|---|---|---|
| settings.pattern | 1 | PATTERN PRINT | 0 | 0-1 | MODEL A/ALL MODEL B/ALL MODEL C/ V3.01 OR LATER | PATTERN LICENSE | LIMITED | PRINTER |
| settings.density | 5 | DENSITY | 5 | 0-10 | MODEL A/ALL MODEL B/2.01 OR LATER | — | UNLIMITED | PRINTER |
| ... | | | | | | | | |

FIG. 18

| KEY IDENTIFIER | VALUE | UI DISPLAY TEXT | INITIAL VALUE | RANGE | APPLICABLE MODEL/ FIRM VERSION | DISPLAY CONDITION | SYNC TARGET | MANAGEMENT CONTROLLER |
|---|---|---|---|---|---|---|---|---|
| settings.copy_ cur_page | 0 | NO DISPLAY (PAGE NUMBER OF COPYING) | 0 | 0-999 99 | ALL | — | LIMITED | SCANNER |
| ... | | | | | | | | |

FIG. 19

| CONTROLLER | POWER STATE |
|---|---|
| INFORMATION PROCESS | ENERGIZED |
| PRINTER | ENERGIZED |
| SCANNER | SLEEP (NON-ENERGIZED) |

FIG. 20

| CONTROLLER | LAST SYNCHRONIZATION TIME |
|---|---|
| INFORMATION PROCESS | 2013/6/18/17:13 |
| PRINTER | 2013/6/18/18:43 |
| SCANNER | 2013/6/18/18:43 |

FIG. 22

| KEY IDENTIFIER | VALUE | LAST UPDATE TIME | SYNC TARGET | MANAGEMENT CONTROLLER |
|---|---|---|---|---|
| settings.sleep_time | 3600 | 2013/9/8/17:35 | UNLIMITED | INFORMATION PROCESS |
| settings.density | 0 | 2013/9/9/12:01 | UNLIMITED | PRINTER |
| settings.dns_address | "xxx.xxx.xxx.xxx" | 2013/6/18/17:44 | UNLIMITED | INFORMATION PROCESS |

FIG. 23

```
<?xml version="1.0" encoding="utf-8"?>
<device_data xmlns="http://www.canon.com/device_data">
    <xml_information>
        <version>1.00</version>
    </xml_information>
    <X-time-server>201309101128</X-time-server>
    <settings.sleep_time>3600</settings.sleep_time>
    <settings.density>0</settings.density>
    <settings.dns_address>xxx.xxx.xxx.xxx</settings.dns_address>
</device_data>
```

*FIG. 25*

| CONTROLLER | POWER STATE |
| --- | --- |
| INFORMATION PROCESS | ENERGIZED |
| PRINTER | SLEEP (NON-ENERGIZED) |
| SCANNER | SLEEP (NON-ENERGIZED) |

INFORMATION PROCESSING APPARATUS THAT PERFORMS SET VALUE SYNCHRONIZATION PROCESS, CONTROL, METHOD THEREFOR, STORAGE MEDIUM STORING CONTROL PROGRAM THEREFOR, AND INFORMATION PROCESSING SYSTEM

BACKGROUND OF THE INVENTION

Field of the Invention

The present invention relates to an information processing apparatus, a control method therefor, a storage medium storing a control program therefor, and an information processing system, and in particular, relates to a set-value synchronization process for synchronizing a set value saved in an information processing apparatus with a set value saved in another information processing apparatus.

Description of the Related Art

There is a known method that saves master data of various kinds of set values saved in an information processing apparatus like a multifunctional peripheral device in another information processing apparatus like a server and unitarily manages the master data. These set values are synchronized mutually. Accordingly, when the master data saved in the server is changed, the server notifies the multifunctional peripheral device of the post-changing set values, and the set values saved in the multifunctional peripheral device are changed. In the same manner, when the set values saved in the multifunctional peripheral device are changed, the master data saved in the server is also changed (see Japanese Laid-Open Patent Publication (Kokai) No. 2010-283618 (JP 2010-283618A).

Furthermore, a system that synchronizes setting values saved in a multifunctional peripheral device with master data saved in a server is disclosed in Japanese Laid-Open Patent Publication (Kokai) No. 2010-173318 (JP 2010-173318A), for example.

The image forming apparatus disclosed in JP 2010-173318A is provided with a plurality of devices of which energization states are controllable independently. When synchronizing data is received from the server and when a device that the synchronizing data should be reflected is in a non-energized state for saving power, update using the synchronizing data is suspended until the device concerned shifts to an energized state.

Incidentally, when synchronizing data is frequently changed in the server used as a transmitting source of synchronizing data, the image forming apparatus at a receiving side preferably reflects the post-changed synchronizing data to each device and operates whenever the synchronizing data is changed. In such a case, when the synchronizing data that has been already received is reflected to the target device after the device shifts to the energized state according to the method of JP 2010-173318A, there is no guarantee that the reflected synchronizing data is the same as the newest synchronizing data that is saved in the server at that point.

Accordingly, in order to reflect the newest synchronizing data to the target device and to make it operate, it is necessary to receive the synchronizing data from the server again after the target device shifts to the energized state. As a result, since the synchronizing data received while the target device is in the non-energized state is not used, the network communication concerning the receiving of the synchronizing data concerned becomes wasteful communication.

SUMMARY OF THE INVENTION

The present invention provides an information processing apparatus, a control method therefor, a storage medium storing a control program therefor, and an information processing system, which are capable of reducing total network traffic without wasting received synchronizing data in the information processing apparatus with a plurality of devices of which energization states are controllable independently.

Accordingly, a first aspect of the present invention provides an information processing apparatus including a plurality of devices of which energization states are controllable independently and that perform information processes according to set data, a determination unit configured to determine whether each of the plurality of devices is in an energized state, a request unit configured to request update information about set data concerning a device that is determined being in the energized state by the determination unit from an external apparatus connected to the information processing apparatus through a network, and an update unit configured to perform an update process that updates the set data according to the update information transmitted from the external apparatus in response to the request.

Accordingly, a second aspect of the present invention provides an information processing system including an information processing apparatus that performs an information process according to set data, and an external apparatus that is connected to the information processing apparatus through a network and that saves update information about the set data. The information processing apparatus includes a plurality of devices of which energization states are controllable independently and that perform information processes according to set data, a determination unit configured to determine whether each of the plurality of devices is in an energized state, a request unit configured to request update information about set data concerning a device that is determined being in the energized state by the determination unit, and an update unit configured to perform an update process that updates the set data according to the update information obtained in response to the request. The external apparatus includes a generation unit configured to generate the update information in response to the request, and a transmission unit configured to transmit the update information to the information processing apparatus as a response.

Accordingly, a third aspect of the present invention provides a control method for an information processing apparatus, the control method including a determination step of determining whether each of a plurality of devices of which energization states are controllable independently and that perform information processes according to set data is in an energized state, a request step of requesting update information about set data concerning a device that is determined being in the energized state in the determination step from an external apparatus connected to the information processing apparatus through a network, and an update step of updating the set data according to the update information transmitted from the external apparatus in response to the request.

Accordingly, a fourth aspect of the present invention provides a non-transitory computer-readable storage medium storing a control program causing a computer to execute the control method of the third aspect.

According to the present invention, the total network traffic is reduced without wasting received synchronizing data in the information processing apparatus with a plurality of devices of which energization states are controllable independently.

Further features of the present invention will become apparent from the following description of exemplary embodiments with reference to the attached drawings.

BRIEF DESCRIPTION OF THE DRAWINGS

FIG. 8 is a view showing an example of data stored in a set-value information DB shown in FIG. 7.

FIG. 9 is a view showing an example of data stored in a common set value DB shown in FIG. 7.

FIG. 10 is a view showing an example of data stored in an individual set value DB shown in FIG. 7.

FIG. 11 is a view showing an example of device configuration information about each individual multifunctional peripheral device managed in a configuration information management DB shown in FIG. 7.

FIG. 12 is a view showing an example of data stored in a user information DB shown in FIG. 7.

FIG. 13 is a view showing an example of data stored in a user-set-value DB shown in FIG. 7.

FIG. 16 is a view showing an example of data stored in an information-process-set-value DB shown in FIG. 15.

FIG. 17 is a view showing an example of data stored in a printer-set-value DB shown in FIG. 15.

FIG. 18 is a view showing an example of data stored in a scanner-set-value DB shown in FIG. 15.

FIG. 19 is a view showing examples of power supply state of controllers managed by a power supply management module shown in FIG. 15.

FIG. 20 is a view showing an example of data stored in a last synchronization time DB shown in FIG. 15.

FIG. 22 is a view showing an example of data used in set-value update information generated by a set-data management module shown in FIG. 14.

FIG. 23 is a view showing an example of the set-value update information generated by the set-data management module shown in FIG. 14.

FIG. 25 is a view showing examples of the power supply states of the controllers after shift of the second controller shown in FIG. 3 to a non-energized state.

DESCRIPTION OF THE EMBODIMENTS

Hereafter, embodiments according to the present invention will be described in detail with reference to the drawings.

Figure 1:
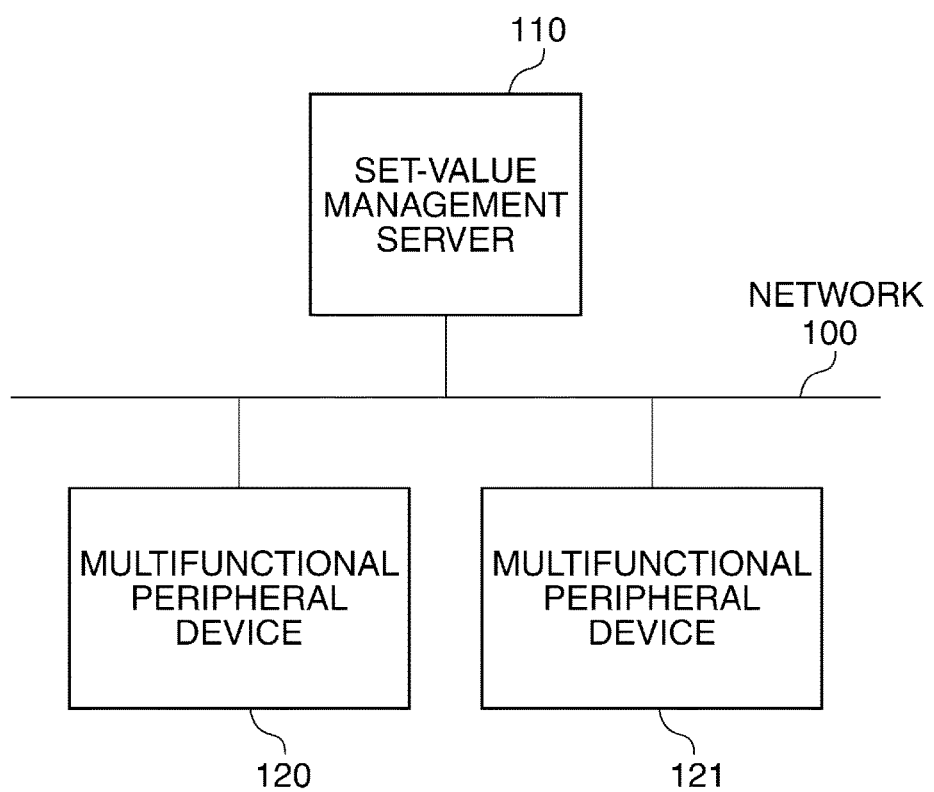
FIG. 1 is a block diagram schematically showing an example of an information processing system to which an information processing apparatus according to a first embodiment of the present invention is connected.

FIG. 1 is a block diagram schematically showing an example of an information processing system to which an information processing apparatus according to a first embodiment of the present invention is connected.

In the illustrated information processing system, an image forming apparatus, such as a multifunctional peripheral device, is used as an example of an information processing apparatus. Then, a set-value managing server (hereinafter referred to as a server) 110 as an external apparatus, and multifunctional peripheral devices 120 and 121 are connected to a network 100. Although the multifunctional peripheral devices 120 and 121 are connected to the network 100 in the illustrated example, it is enough to connect at least one multifunctional peripheral device to the network 100.

The server 110 manages a master data of set values set in the multifunctional peripheral devices 120 and 121.

Each of the multifunctional peripheral devices 120 and 121 has a plurality of kinds of functions. For example, each of the multifunctional peripheral devices 120 and 121 has a copy function, a facsimile function, and the like. Each of the multifunctional peripheral devices 120 and 121 saves set values used when these functions are performed.

Each of the multifunctional peripheral devices 120 and 121 notifies the server 110 of set-value update information (i.e., change data showing changed contents) through the network 100, when a saved set value is changed. When receiving the set-value update information from the multifunctional peripheral device 120 or 121, the server 110 changes the master data according to the set-value update information concerned. On the other hand, when the master data is changed, the server 110 notifies the multifunctional peripheral device 120 and the multifunctional peripheral device 121 of the set-value update information through the network 100. When receiving the set-value update information showing that the master data has been changed from the server 110, each of the multifunctional peripheral devices 120 and 121 changes the set values on the basis of the set-value update information.

Some types of set values may be synchronized between the multifunctional peripheral device 120 and the multifunctional peripheral device 121. In such a case, when the master data saved in the server 110 is changed, the server 110 notifies both the multifunctional peripheral devices 120 and 121 of the set-value update information. Furthermore, when a set value is changed in either of the multifunctional peripheral devices 120 and 121, the multifunctional peripheral device in which the set value is changed notifies the server 110 of the set-value update information first. Then, the server 110 notifies the other multifunctional peripheral device of the set-value update information.

Figure 2:
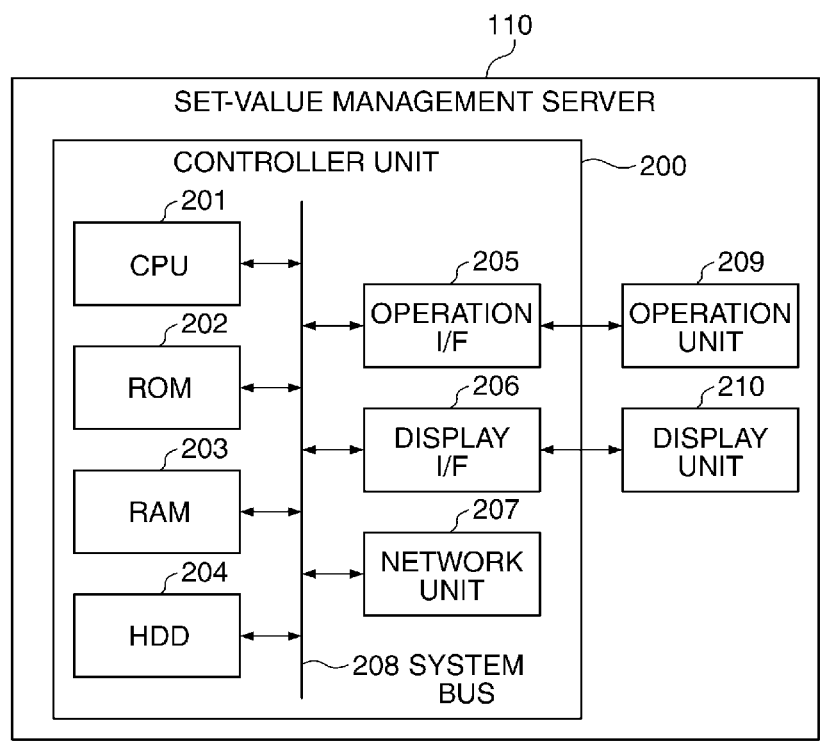
FIG. 2 is a block diagram schematically showing an example of a configuration of a server shown in FIG. 1.

FIG. 2 is a block diagram schematically showing an example of a configuration of the server 110 shown in FIG. 1.

The server 110 has a controller unit 200, an operation unit 209, and a display unit 210. Then, the controller unit 200 is provided with a CPU (Central Processing Unit) 201.

The CPU 201 starts an OS (Operating System) with a boot program stored in a ROM (Read Only Memory) 202. The CPU 201 runs an application program (AP) stored in an HDD (Hard Disk Drive) 204 on the OS, and performs various processes. A RAM (Random Access Memory) 203 is used as a workspace of the CPU 201.

The HDD 204 stores the AP, master data about the set values set in the multifunctional peripheral devices 120 and 121, and the like. It should be noted that a management method for the master data will be mentioned later.

The ROM 202 and the RAM 203 are connected to the CPU 201 through a system bus 208. An operation I/F 205, display I/F 206, and network unit 207 are also connected to the CPU 201. The operation I/F 205 is an interface with the operation unit 209. The operation unit 209 has a pointing device (for example, a mouse) and a keyboard. The operation I/F 205 sends instructions input by a user using the operation unit 209 to the CPU 201.

The display unit 210 has a display unit. The display I/F 206 sends image data that should be displayed on the display unit 210 to the display unit 210, for example. Moreover, the network unit 207 is connected to the network 100, and transmits and receives information with apparatuses on the network 100 through the network 100.

Figure 3:
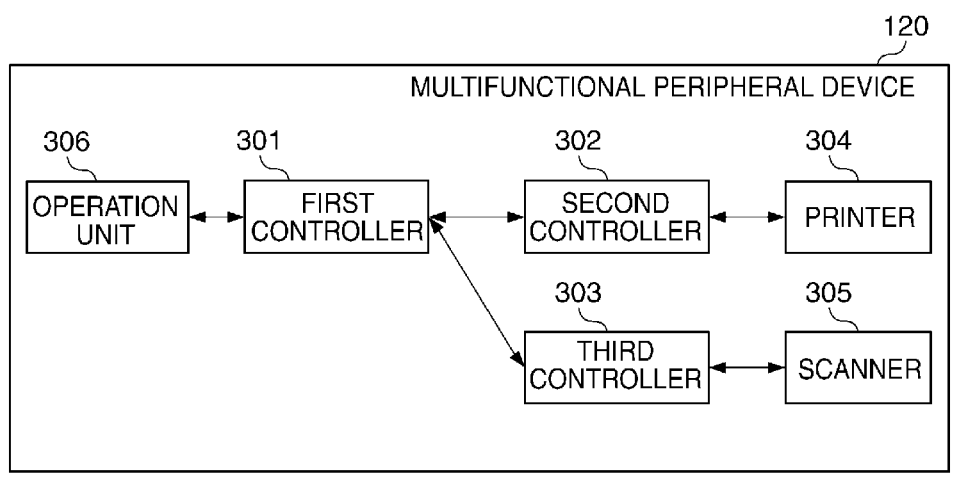
FIG. 3 is a block diagram schematically showing an example of a configuration of a multifunctional peripheral device shown in FIG. 1.

FIG. 3 is a block diagram schematically showing an example of a configuration of the multifunctional peripheral device 120 shown in FIG. 1. Since the configurations of the multifunctional peripheral devices 120 and 121 are identical, the configuration of the multifunctional peripheral device 120 will be focused and described in the following description.

The multifunctional peripheral device 120 is provided with a first controller 301, second controller 302, third controller 303, printer 304, scanner 305, and operation unit 306. The first controller 301 presides over information processing control that is performed with the multifunctional peripheral device 120. The first controller 301 is connected to the operation unit 306, second controller 302, and third controller 302. The first controller 301 controls the second controller 302 and the third controller 302. The second controller 302 controls the printer 304 that is an image output device. Moreover, the third controller 303 controls the scanner 305 that is an image input device.

Figure 4:
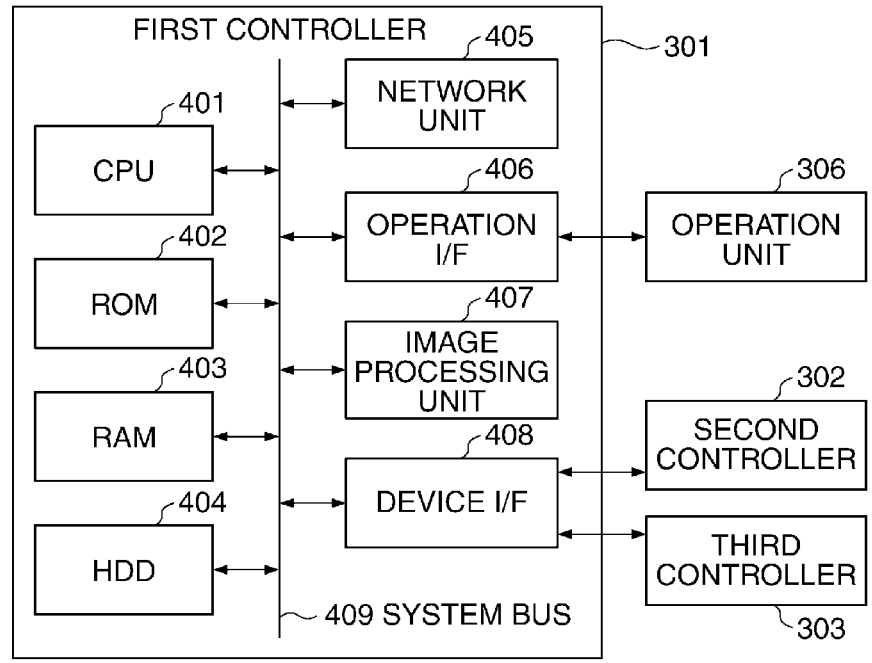
FIG. 4 is a block diagram schematically showing an example of a configuration of a first controller shown in FIG. 3.

FIG. 4 is a block diagram schematically showing an example of a configuration of the first controller 301 shown in FIG. 3.

The first controller 301 has a CPU 401. The CPU 401 starts an OS by a boot program stored in a ROM 402. The CPU 401 performs an AP stored in an HDD 404 on the OS, and performs various processes. A RAM 403 is used as a workspace of the CPU 401. Moreover, the RAM 403 is used as an image memory area for storing image data temporarily.

The HDD 404 stores the AP, image data, and various set values. It should be noted that a management method of the set values in the multifunctional peripheral devices 120 and 121 will be mentioned later.

The ROM 402 and RAM 403 are connected to the CPU 401 through a system bus 409. An operation I/F 406, device I/F 408, and network unit 407 are also connected to the CPU 401.

A touch panel is arranged on a display screen of the operation unit 306. The operation I/F 406 is an interface with the operation unit 306, and outputs the image data that should be displayed on the operation unit 306 to the operation unit 306. The operation I/F 406 sends instructions input by a user using the operation unit 306 to the CPU 401.

The second controller 302 and the third controller 303 are connected to the device I/F 408. The device I/F 408 converts the image data between a synchronous system and an asynchronous system. The network unit 405 is connected to the network 100, and transmits and receives information with apparatuses on the network 100 through the network 100. The image processing unit 407 applies an output image process to the image data output to the printer 304. Furthermore, the image processing unit 407 applies an input image process, image rotation process, image compression process, definition conversion process, color space conversion process, gray scale conversion process, etc. to the image input from the scanner 305.

Figure 5:
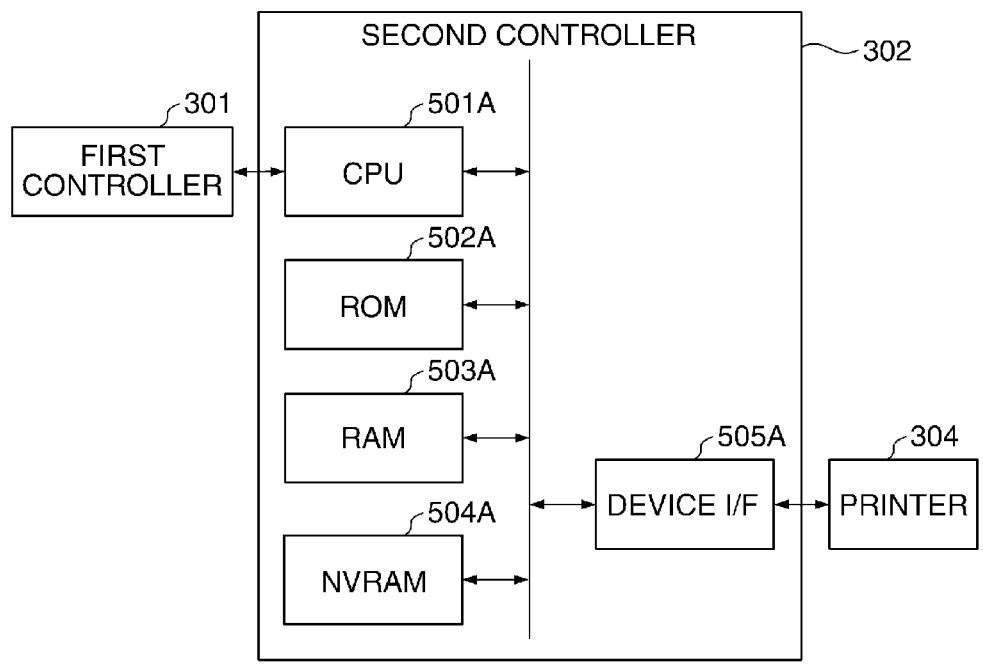
FIG. 5 is a block diagram schematically showing an example of a configuration of a second controller shown in FIG. 3.

FIG. 5 is a block diagram schematically showing an example of a configuration of the second controller 302 shown in FIG. 3.

The second controller 302 has a CPU 501A. The CPU 501A starts an OS by a boot program stored in a ROM 502A. The CPU 501A performs an AP stored in an NVRAM (nonvolatile memory) 504A on the OS, and performs various processes. A RAM 503A is used as a workspace of the CPU 501A. Moreover, the RAM 503A is used as an image memory area for storing image data temporarily.

The NVRAM 504A stores the AP, image data and various set values. It should be noted that an HDD or an SRAM may be used instead of the NVRAM 504A, for example. A device I/F 505A is an interface between the second controller 302 and the printer 304.

Figure 6:
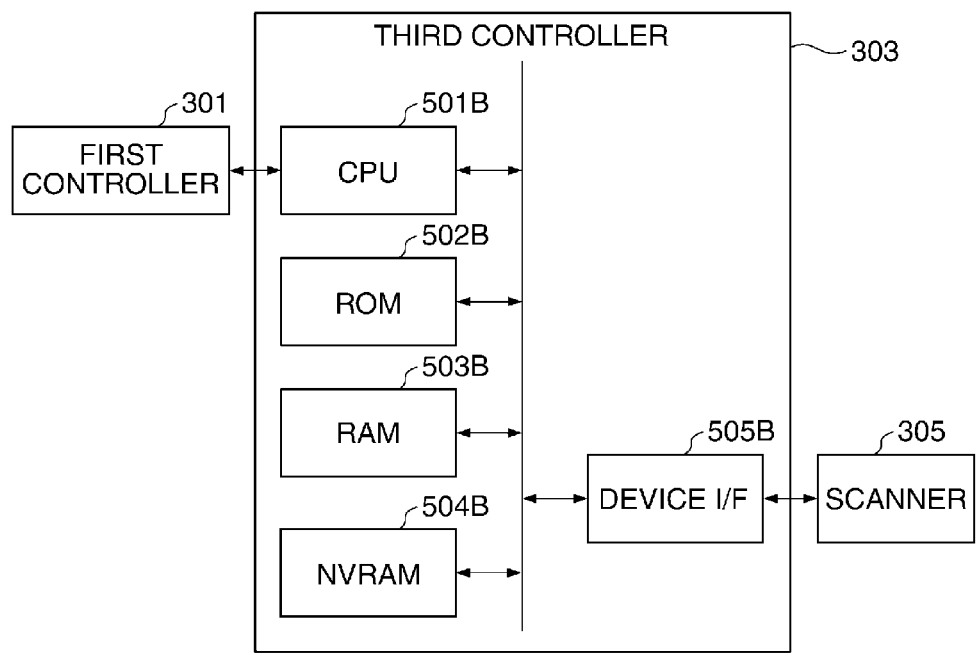
FIG. 6 is a block diagram schematically showing an example of a configuration of a third controller shown in FIG. 3.

FIG. 6 is a block diagram schematically showing an example of a configuration of the third controller 303 shown in FIG. 3.

The third controller 303 has a CPU 501B. The CPU 501B starts an OS by a boot program stored in a ROM 502B. The CPU 501B performs an AP stored in an NVRAM 504B on the OS, and performs various processes. A RAM 503B is used as a workspace of the CPU 501B. Moreover, the RAM 503B is used as an image memory area for storing image data temporarily.

The NVRAM 504B stores the AP, image data and various set values. It should be noted that an HDD or an SRAM may be used instead of the NVRAM 504B, for example. A device I/F 505B is an interface between the third controller 303 and the scanner 305.

Figure 7:
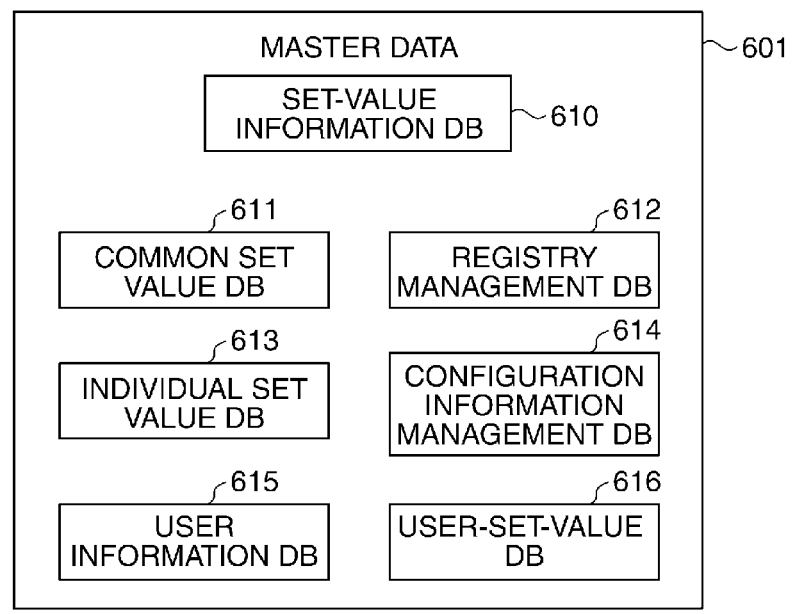
FIG. 7 is a view showing an example of a configuration of master data managed by the server shown in FIG. 2.

FIG. 7 is a view showing an example of a configuration of master data managed by the server 110 shown in FIG. 2.

The master data 601 is provided with a set-value information DB 610, common set value DB 611, registry management DB 612, individual set value DB 613, configuration information management DB 614, user information DB 615 and user-set-value DB 616.

FIG. 8 is a view showing an example of data stored in a set-value information DB 610 shown in FIG. 7.

The set-value information DB 610 stores a text that is suggested to a user, key identifier (item) for identifying a set value at the time of communication with the multifunctional peripheral device 120 or 121, initial value, range, applicable model/firm version, and display condition of a set value, as metadata about the set values managed by the server 110.

The set values managed in the set-value information DB 610 depend on the model and firmware version of the multifunctional peripheral devices 120 and 121. Accordingly, information about existence of a set value, a range and initial value of the set value may differ from each other.

As shown in FIG. 8, for example, the set value of which the key identifier is "settings.pattern" exists in all the multifunctional peripheral devices of the models "A" and "B". On the other hand, a multifunctional peripheral device of the model "C" has this set value only when the firmware version is 3.01 or later.

Moreover, the range and initial value of the set value of which the key identifier is "settings.density" vary depending on the version of the firmware installed to the device of the model "B". A range and initial value of a set value of which key identifier is other than "settings.pattern" and "settings.density" do not vary depending on the model and the version of the firmware.

The set-value information DB 610 manages information that shows a type of the multifunctional peripheral device that is a synchronization (sync) target of a set value. The information that shows a synchronization target is "UNLIMITED" or "LIMITED". The information of "UNLIMITED" means that the set value is able to be synchronized among all the other multifunctional peripheral devices. Moreover, the information of "LIMITED" means that the set value is able to be synchronized only among multifunctional peripheral devices of the same type.

Furthermore, the set-value-information DB 610 stores management controller information that specifies a controller that manages the set value. In the illustrated example, there are three management controllers of "INFORMATION PROCESS", "PRINTER", and "SCANNER". Then, "INFORMATION PROCESS", "PRINTER", and "SCANNER" respectively show that the set values are managed by the first controller 301, the second controller 302, and the third controller 303.

In the example shown in FIG. 8, the set values of which the key identifiers are "settings.pattern" and "settings.density" are managed by the second controller 302. Then, the set values of which the key identifiers are "settings.device_sirial", "settings.sleep_time", and "settings.dns_address" are managed by the first controller 301. Moreover, the set value of which the key identifier is "settings.copy_cur_page" is managed by the third controller 303.

FIG. 9 is a view showing an example of data stored in the common set value DB 611 shown in FIG. 7.

The illustrated common set value DB 611 manages the set values by sharing and synchronizing among all the multifunctional peripheral devices 120 and 121 of which the set values are managed by the server 110. The common set value DB 611 stores the key identifier, the value corresponding to the key identifier, the update time for the set value, the synchronization target information, and the management controller information. This key identifier has the same system as the key identifier in the set-value information DB 610.

FIG. 10 is a view showing an example of data stored in the individual set value DB 613 shown in FIG. 7.

The individual set value DB 613 manages the set values that are individually different between the plurality of multifunctional peripheral devices 120 and 121 of which the set values are managed by the server 110. It should be noted that the individual set value DB 613 shall be given to every multifunctional peripheral device (there are two individual set value DBs in this example). The individual set value DB 613 stores the key identifier, the value corresponding to the key identifier, the update time for the set value, the synchronization target information, and the management controller information. This key identifier has the same system as the key identifier in the set-value information DB 610. Moreover, the set value of which the synchronization target information is "LIMITED" shall be stored in the individual set value DB 613.

FIG. 11 is a view showing an example of the device configuration information about each individual multifunctional peripheral device managed in the configuration information management DB 614 shown in FIG. 7.

The configuration information management DB 614 stores and manages a plurality of pieces of the device configuration information. The device configuration information has an individual identifier for identifying an individual multifunctional peripheral device, a model name, and a version of firmware (a firm version). Furthermore, the device configuration information has license information (an installed license) showing available functions and accessory information showing available accessories. It should be noted that the model name, firm version, license information, and the like have the same system as the information stored in the set-value information DB 610.

The registry management DB 612 manages the individual identifier of an individual multifunctional peripheral device of which the set values are managed by the server 110.

FIG. 12 is a view showing an example of data stored in a user information DB 615 shown in FIG. 7.

The user information DB 615 manages information about a user who uses the multifunctional peripheral device. The user information DB 615 stores a user ID for identifying a user uniquely and a user name that a user inputs for login.

FIG. 13 is a view showing an example of data stored in a user-set-value DB 616 shown in FIG. 7.

The user-set-value DB 616 manages the set values for every user who can use the multifunctional peripheral device. The user-set-value DB 616 stores a user ID for identifying a user uniquely, a key identifier for identifying a set value, a content (a value) of the set value, and a last update time of the set value. Furthermore, this user ID is the same system as the user ID of the user information DB 615.

The server 110 collectively manages the set values that are individually different between the plurality of managed multifunctional peripheral devices, the set values that are common among all the managed multifunctional peripheral devices, and the metadata of the set values, using the databases in the master data 601 mentioned above.

Figure 14:
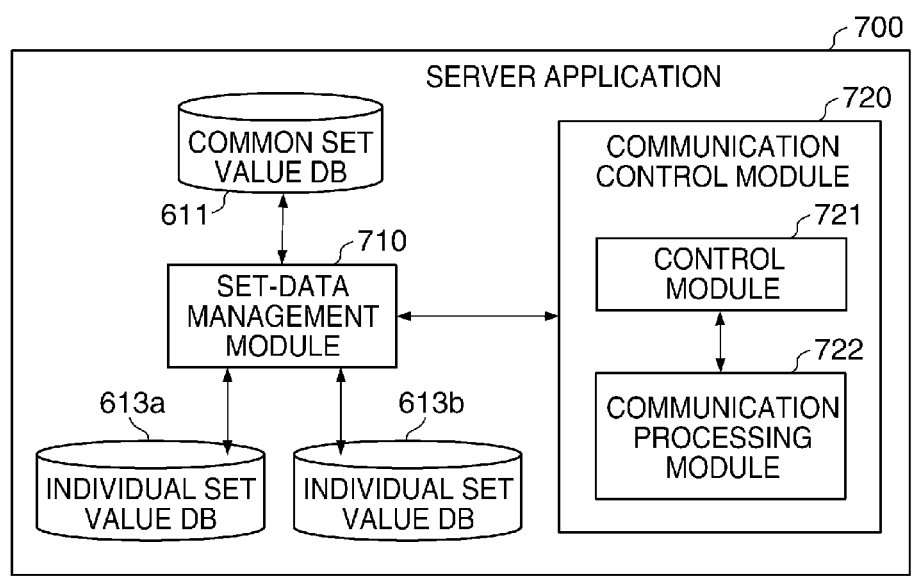
FIG. 14 is a view for describing functions of a server application that runs on the server shown in FIG. 2.

FIG. 14 is a view for describing functions of a server application that runs on the server 110 shown in FIG. 2.

The server application (hereinafter referred to as a server AP) 700 is stored in the RAM 203, the HDD 204, or the ROM 202 shown in FIG. 2, and is performed by the CPU 201. The server AP 700 has a set-data management module 710 and a communication control module 720.

The set-data management module 710 manages the above-mentioned common set value DB 611 and individual set value DB 613 among the master data 601 saved in the server 110. It should be noted that the number of the individual set value DBs 613 is equal to the number of the multifunctional peripheral devices of which the set values are synchronized with the server 110. In the information processing system shown in FIG. 1, the multifunctional peripheral devices 120 and 121 are subjected to management by the server 110. Accordingly, the set-data management module 710 manages the individual set value DBs 613a and 613b corresponding to the multifunctional peripheral devices 120 and 121.

The common set value DB 611 and the individual set value DBs 613a and 613b that are managed by the set-data management module 710 are saved in the HDD 204, the RAM 203, or the ROM 202.

The communication control module 720 is provided with a control module 721 that controls a set-value synchronization process with the multifunctional peripheral device and a communication processing module 722 that performs communication process through the network unit 207. It should be noted that processes performed by these control module 721 and communication processing module 722 will be mentioned later.

When the communication control module 720 receives the set-value update information from the multifunctional peripheral device, the set-data management module 710 reflects the set-value update information concerned to the common set value DB 611 and individual set value DBs 613a and 613b, which are managed by the server 110. Moreover, when the communication control module 720 receives a set-value-update-information request from the multifunctional peripheral device, the set-data management module 710 generates set-value update information that should be transmitted to the multifunctional peripheral device. Then, the set-data management module 710 notifies the communication control module 720 of the set-value update information concerned.

The communication control module 720 controls a set-value synchronization communication with the multifunctional peripheral device. For example, when the communication processing module 722 receives the set-value update information from the multifunctional peripheral device, the control module 721 notifies the set-data management module 710 of the set-value update information concerned. Moreover, when the communication processing module 722 receives a set-value-update-information request from the multifunctional peripheral device, the control module 721 obtains the set-value update information about the multifunctional peripheral device from the set-data management module 710. Then, the control module 721 instructs the communication processing module 722 to transmit the set-value update information concerned to the multifunctional peripheral device. As a result of this, the communication processing module 722 communicates with the multifunctional peripheral device.

Figure 15:
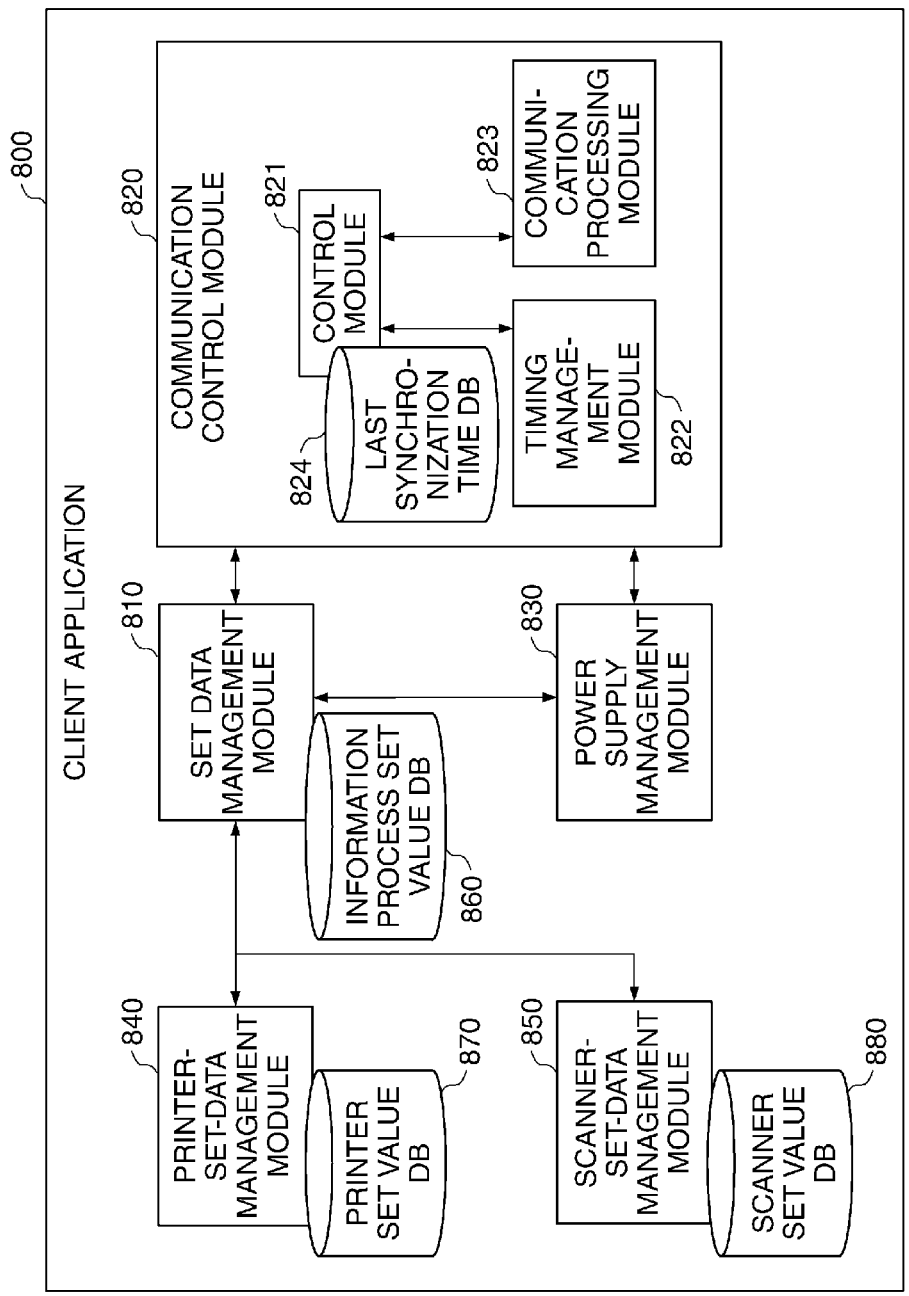
FIG. 15 is a view for describing functions of a client application that runs on the multifunctional peripheral device shown in FIG. 3.

FIG. 15 is a view for describing functions of a client application that runs on the multifunctional peripheral device shown in FIG. 3.

The client application (hereinafter referred to as a client AP) 800 is stored in the RAM 403, HDD 404, or ROM 402 of the first controller 301 and is performed by the CPU 401, for example.

The client AP 800 has a set-data management module 810 and a communication control module 820. The set-data management module 810 presides over management of set values saved in the multifunctional peripheral device, and manages the set values saved in the information-process-set-value DB 860.

FIG. 16 is a view showing an example of data stored in the information-process-set-value DB 860 shown in FIG. 15.

The information-process-set-value DB 860 stores a key identifier for identifying a set value, set value (value), UI display text, initial value, range, display condition, synchronization target information, and management controller information. In particular, the information-process-set-value DB 860 stores the set values of which the management controller information is "INFORMATION PROCESS". The members stored in the information-process-set-value DB 860 is managed in the same system as the members managed in the master data 601.

When a set value is changed in the server 110 or the multifunctional peripheral device, at least a key identifier and value among the data stored in the information-process-set-value DB 860 shown in FIG. 16 are reported from the server 110 or the multifunctional peripheral device, and the set value enters a synchronizing state. It should be noted that the DB 860 is stored in the HDD 404 of the first controller 301.

A printer-set-data management module 840 manages a printer-set-value DB 870.

FIG. 17 is a view showing an example of data stored in the printer-set-value DB 870 shown in FIG. 15.

The members stored in the printer-set-value DB 870 is the same as the members in the above-mentioned information-process-set-value DB 860. However, the printer-set-value DB 870 consists of the set values of which the management controller information is "PRINTER". The printer-set-data management module 840 is stored in the RAM 503A, ROM 502A, or NVRAM 504A of the second controller 302, and is performed by the CPU 501A. Moreover, the printer-set-value DB 870 is stored in the NVRAM 504A of the second controller 302.

A scanner-set-data management module 850 manages a scanner-set-value DB 880.

FIG. 18 is a view showing an example of data stored in the scanner-set-value DB 880 shown in FIG. 15.

The members stored in the scanner-set-value DB 880 is the same as the members in the above-mentioned information-process-set-value DB 860 and printer-set-value DB 870. However, the scanner-set-value DB 880 consists of the set values of which the management controller information is "SCANNER". The scanner-set-data management module 850 is stored in the RAM 503B, ROM 502B, or NVRAM 504B of the third controller 303, and is performed by the CPU 501B. Moreover, the scanner-set-value DB 880 is stored in the NVRAM 504B of the third controller 303.

In the following description, the information-process-set-value DB 860, printer-set-value DB 870, and scanner-set-value DB 880 may be generically called a "controller set value DB". Moreover, the printer-set-data management module 840 and scanner-set-data management module 850 may be generically called "device-set-data management modules". Furthermore, the first controller 301, second controller 302, and third controller 303 may be generically called "controllers".

The communication control module 820 is provided with a plurality of functional blocks, and controls communication through the network unit 405. The communication control module 820 has a control module 821, timing management module 822, communication processing module 823, and last synchronization time DB 824. The control module 821 controls a set-value synchronization process with the server 110. The timing management module 822 manages a synchronization timing of setting data (set values). The communication processing module 823 performs a communications process through the network unit 405. A power supply management module 830 manages power supply states of the controllers of the multifunctional peripheral device.

FIG. 19 is a view showing examples of the power supply states of the controllers managed by the power supply management module 830 shown in FIG. 15.

The power supply management module 830 manages whether a power supply state of a controller is an "ENERGIZED" state or "NON-ENERGIZED(Sleep)" state. In the example shown in FIG. 19, the first controller 301 (information process) and the second controller 302 (printer) are in the energized state at the present time. Moreover, the third controller 303 (scanner) is in a non-energized state (sleep state).

When the communication control module 820 mentioned below obtains the set-value update information from the server 110, the set-data management module 810 receives the set-value update information concerned from the communication control module 820. Then, the set-data management module 810 reflects the set-value update information to the information-process-set-value DB 860. Furthermore, the set-data management module 810 requests the printer-set-data management module 840 and scanner-set-data management module 850 to reflect the set-value update information to the DBs 870 and 880.

Moreover, when a set value is updated in one of the set value DBs 860, 870, and 880, the set-data management module 810 requests the communication control module 820 to reflect the set-value update information to the master data 601 managed by the server 110.

The communication control module 820 controls a set-value synchronization communication with the server 110. The timing management module 822 determines a timing at which the set-value update information in the master data 601 is obtained from the server 110 periodically (i.e., at predetermined intervals). Receiving the notification from the timing management module 822, the control module 821 instructs the communication processing module 823 to perform the communication process with the server 110.

In this case, the control module 821 obtains the power supply states of the multifunctional peripheral device from the power supply management module 830 and obtains the last synchronization time from the last synchronization time DB 824. Then, the control module 821 changes the communication process instructed to the communication processing module 823 on the basis of the power supply states and the last synchronization time. Furthermore, the control module 821 receives the set-value update information in the master data 601 that the communication processing module 823 obtained from the server 110, and requests the set-data management module 810 to reflect the set-value update information.

The last synchronization time saved in the last synchronization time DB 824 is used to manage the time when the multifunctional peripheral device finally obtained the set-value update information from the server 110 and reflected the set-value update information to the set value DBs.

FIG. 20 is a view showing an example of data stored in a last synchronization time DB shown in FIG. 15.

As illustrated, the last synchronization times of the set value DBs 860, 870, and 880 are shown. It should be noted that the last synchronization time DB 824 is stored in the HDD 404 of the first controller 301. Moreover, the set-value synchronization process is performed when the network unit 207 of the server 110 communicates with the network unit 405 of the multifunctional peripheral device through the network 100.

Receiving the request from the set-data management module 810, the printer-set-data management module 840 reflects the set-value update information received from the server 110 to the printer-set-value DB 870. Moreover, when a set value in the printer-set-value DB 870 is changed, the printer-set-data management module 840 requests the set-data management module 810 to perform a reflection process to reflect the set-value update information to the server 110.

Receiving the request from the set-data management module 810, the scanner-set-data management module 850 reflects the set-value update information received from the server 110 to the scanner-set-value DB 880. Moreover, when a set value in the scanner-set-value DB 880 is changed, the scanner-set-data management module 850 requests the set-data management module 810 to perform the reflection process to reflect the set-value update information to the server 110.

Figure 21:
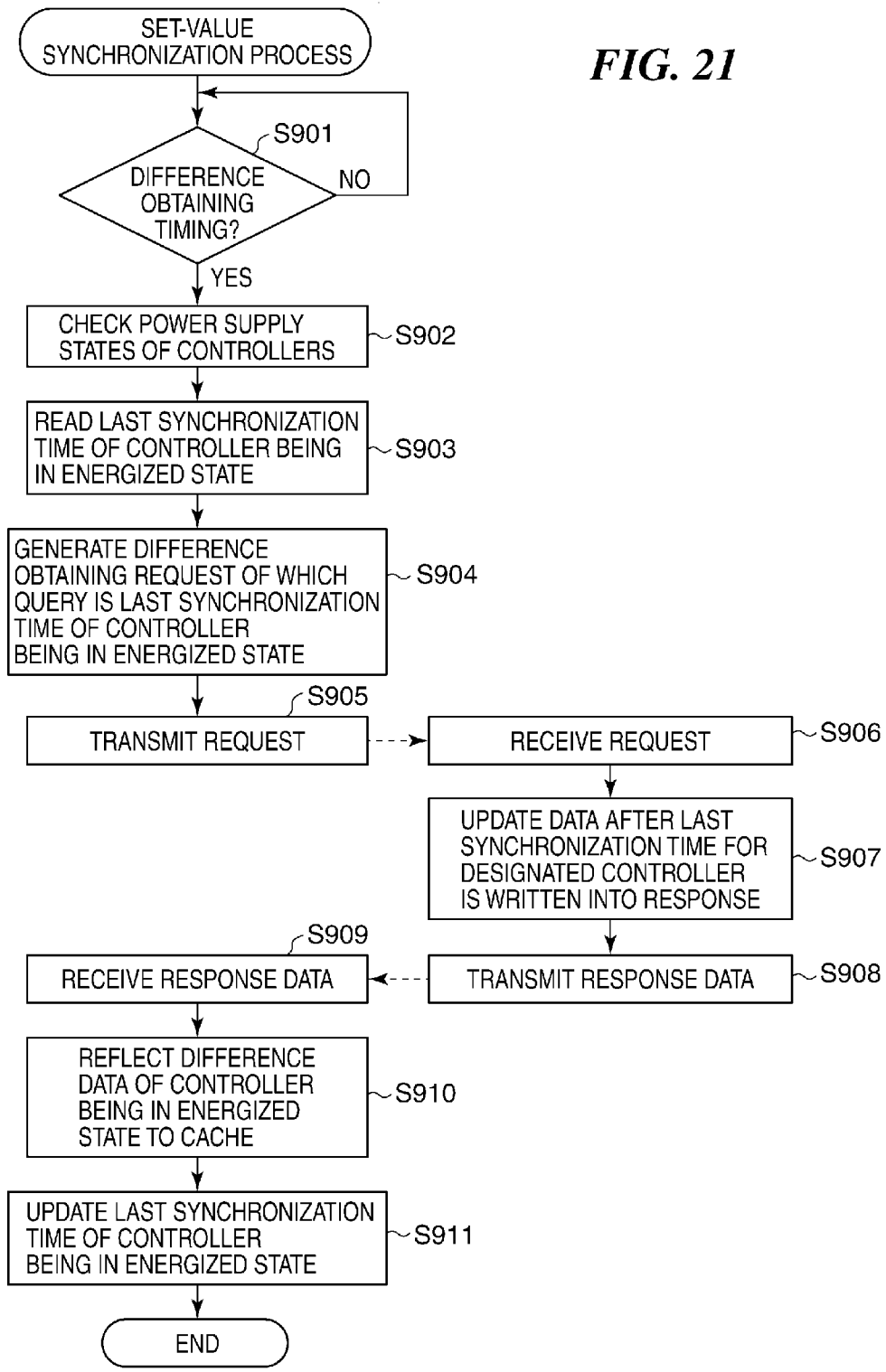
FIG. 21 is a flowchart for describing a set-value synchronization process performed in the multifunctional peripheral device shown in FIG. 3.

FIG. 21 is a flowchart for describing the set-value synchronization process performed in the multifunctional peripheral device shown in FIG. 3.

In the illustrated flowchart, the set-value update information in the master data 601 is obtained from the server 110, and is reflected to the set value DBs. Then, this process is performed by the CPUs 201, 401, 501A, and 501B.

When the set-value synchronization process is started, the timing management module 822 determines whether a timing (difference obtaining timing) at which the set-value update information should be obtained from the server 110 has come (step S901). When determining the timing, the timing management module 822 whether a predetermined time period has elapsed from the time at which the set-value update information was obtained last time. When the predetermined time period has elapsed, it is determined that the difference obtaining timing has come.

As a result of the determination, when determining that it is not the timing of obtaining the set-value update information (NO in the step S901), the timing management module 822 waits. On the other hand, when determining that it is the timing at which the set-value update information should be obtained (YES in the step S901), the timing management module 822 notifies the control module 821 of the result.

The control module 821 obtains the current power supply states of the controllers from the power supply management module 830, and checks the power supply states (step S902). In this place, the power supply states shall be as shown in FIG. 19.

Thus, it is determined whether the image output device (printer) is in the energized state on the basis of whether the second controller 302 that controls the image output device is in the energized state. Moreover, it is determined whether the image input device (scanner) is in the energized state on the basis of whether the third controller that controls the image input device is in the energized state.

Subsequently, the control module 821 reads a last synchronization time of a controller being in the energized state among the controllers of which the power supply states were obtained in the step S902 from the last-synchronization-time DB 824 (step S903). In this place, the last synchronization times of the controllers shall be as shown in FIG. 20. Accordingly, the control module 821 reads the last synchronization time "2013/6/8/17:13" of the first controller 301 (information process) and the last synchronization time "2013/9/18/18:43" of the second controller 302 (printer) in the process in the step S903.

Next, the control module 821 notifies the communication processing module 823 of the last synchronization times of the controllers being in the energized state. Furthermore, the control module 821 instructs the communication processing module 823 to obtain the set-value update information about these controllers from the server 110.

Next, the communication processing module 823 generates a difference obtaining request (requested data) for obtaining the set-value update information about the controllers being in the energized state on the basis of the last synchronization times of these controllers from the server 110 (step S904). Then, the information processing apparatus 823 transmits the request data concerned to the server 110 (step S905).

It should be noted that the request data is transmitted to the server 110 in the request line format of the following HTTP communication, for example. GET http://server_addr/getLastModified?it=201306181713&pt=201305091843

This request data requests to obtain a set value updated after "2013/6/18/17:13" among the set values for the first controller 301 and to obtain a set value updated after "2013/9/18/18:43" among the set values for the second controller 302 from the server 110.

Subsequently, the communication processing module 722 of the server application 700 receives the request data in the server 110 (step S906). Then, the communication processing module 722 notifies the control module 721 of the request data. The control module 721 notifies the set-data management module 710 of a combination of the controller of which the set-value-update information is requested and its last synchronization time among the request data, and requests to obtain the set-value update information.

Next, the set-data management module 710 generates the set-value update information (update data) corresponding to the request condition, and notifies the control module 721 of the result (step S907).

When generating the set-value update information, the set-data management module 710 searches the common-set-value DB 611 and the individual-set-value DB 613 for a key and value (set value) corresponding to a first or second condition, for example. The first condition is that "the management controller information is "information process" and the last update time is 2013/6/18/17:12 or later". The second condition is that "the management controller information is "PRINTER" and the last update time is 2013/9/18/18:42 or later". Then, the set-data management module 710 unites the information obtained by the search and the current time entry to generate the set-value update information.

FIG. 22 is a view showing an example of data used in the set-value update information generated by the set-data management module 710 shown in FIG. 14.

FIG. 22 shows the set values that satisfy the above-mentioned first and second conditions. In this place, three set values of "settings.sleep_time", "settings.density", and "settings.dns_address" become target keys of the set-value update information that will be transmitted to the multifunctional peripheral device. Accordingly, the set-data management module 710 generates the keys and values about these set values as the set-value update information.

FIG. 23 is a view showing an example of the set-value update information generated by the set-data management module 710 shown in FIG. 14.

As shown in FIG. 23, a combination of the time "2013/09/10/11:28" at which the set-value update information is generated and the keys and values of the target set values is generated in the XML data format. It should be noted that the data format of the set-value update information is not limited to the XML data format.

With reference to FIG. 21 again, receiving the set-value update information, the control module 721 instructs the communication processing module 722 to transmit the set-value update information as reply data (response) to the request data from the multifunctional peripheral device.

Then, the communication processing module 722 transmits the reply data to the multifunctional peripheral device (step S908).

Subsequently, the communication processing module 823 receives the reply data in the client application 800 (step S909). Then, the communication control module 823 notifies the control module 821 of the reply data.

The control module 821 requests the set-data management module 810 to reflect the set-value update information to the set value DBs. Then, the set-data management module 810 extracts the setting value included in the information-process-set-value DB 860 from among the set values included in the set-value update information. That is, the set value of which the management controller is "INFORMATION PROCESS" is extracted. Then, the set-data management module 810 reflects the information extracted to the information-process-set-value DB 860 (step S910).

For example, the set-data management module 810 reflects the data concerning "settings.sleep_time" and "settings.dns_address" to the information-process-set-value DB 860.

Next, the set-data management module 810 requests the printer-set-data management module 840 to perform the reflection process to reflect the set value of which the management controller is "PRINTER". Moreover, the set-data management module 810 requests the scanner-set-data management module 850 to perform the reflection process to reflect the set value of which the management controller is "SCANNER".

However, since the power supply state of the third controller 303 obtained in the process in the step S902 shows the non-energized state, the set value for the scanner is not received in this place. Accordingly, there is no set value of which the management controller is "SCANNER". Accordingly, the set-data management module 810 will request the printer-set-data management module 840 only to perform the reflection process of the set-value update information.

The printer-set-data management module 840 performs the reflection process of the set-value update information to the printer-set-value DB 870, and notifies the set-data management module 810 of the completion of the process when the process is completed. For example, the printer-set-data management module 840 reflects the data concerning "settings.density" to the printer-set-value DB 870.

When receiving the notification that the reflection process is completed, the set-data management module 810 notifies the control module 821 that the process to reflect the set-value update information in the multifunctional peripheral device has been completed.

The control module 821 updates the last synchronization time corresponding to the controller that was determined as being in the energized state in the process in the step S902 in the last-synchronization-time DB 824 with the time entry "2013/09/10/11:28" included in the set-value update information (step S911). Then, the control module 821 finishes the set-value synchronization process.

As mentioned above, the update information about a device controlled by a controller that is determined as in the energized state is requested from an external apparatus in the first embodiment of the present invention. On the other hand, set-value update information concerning a set value about a controller being in the non-energized state is not requested. That is, it is controlled so as not to obtain the set-value update information concerning the controller being in the non-energized state. As a result of this, the set-value update information that cannot be reflected to the multifunctional peripheral device is not requested and received in the process to obtain set-value update information that is performed periodically in the multifunctional peripheral device, which prevents a unless increase of the network traffic.

Next, a multifunctional peripheral device as an information processing apparatus according to a second embodiment of the present invention will be described. It should be noted that configurations (hardware configurations and software configurations) of a multifunctional peripheral device and a server in the second embodiment are similar to the configurations of the multifunctional peripheral device and the server described in the first embodiment.

Figure 24:
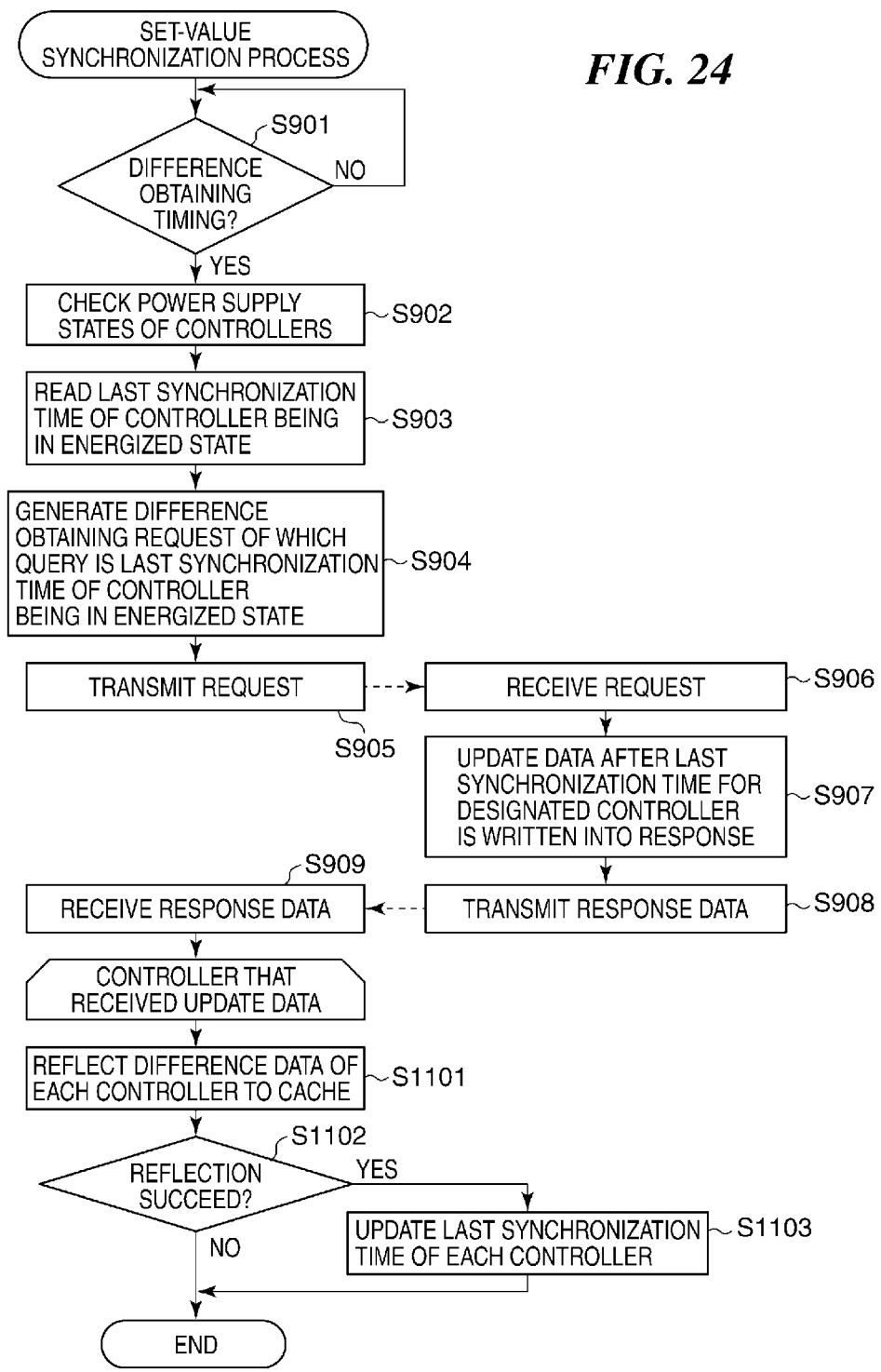
FIG. 24 is a flowchart for describing an example of a set-value synchronization process performed in a multifunctional peripheral device according to a second embodiment of the present invention.

FIG. 24 is a flowchart for describing an example of a set-value synchronization process performed in the multifunctional peripheral device according to the second embodiment of the present invention. It should be noted that steps in the illustrated flowchart that are the same as the steps in the flowchart in FIG. 21 are indicated by the same reference numerals, and their descriptions are omitted.

First, the process in the steps S901 through S908 is performed as described in FIG. 21. In this place, when the communication processing module 823 receives the set-value update information shown in FIG. 23 from the server 110 in the process in the step S909, the second controller 302 shall shift to the non-energized state.

FIG. 25 is a view showing examples of the power supply states of the controllers after the second controller shown in FIG. 3 shifts to the non-energized state.

As illustrated, the first controller 301 (information process) is in the energized state, and the second controller 302 (printer) and the third controller 303 (scanner) are in the non-energized state.

In this case, a process in the following steps S1101 through S1103 is performed for the first controller 301 and second controller 302 that were determined as being in the energized states in the process in the step S902, in order.

First the set-data management module 810 performs the reflection process to the information-process-set-value DB 860 about "settings.sleep_time" and "settings.dns_address" of which the management controller information is "information process" among the set-value update information received from the server 110 (step S1101). Subsequently, the set-data management module 810 notifies the control module 821 of the result of the reflection process.

The control module 821 determines the result of the reflection process (step S1102). In this place, since the first controller 301 is in the energized state, the reflection process of the set-value update information will succeed. When the reflection process succeeds (YES in the step S1102), the control module 821 updates the last synchronization time of the first controller 301 in the last-synchronization-time DB 824 to the time "2013/09/10/11:28" described in the set-value update information (step S1103). Then, the control module 821 finishes the set-value synchronization process concerning the first controller 301.

Next, the control module 821 performs the process in the steps S1101 through S1103 for the second controller 302. First, the set-data management module 810 requests the printer-set-data management module 840 to perform the reflection process about "settings.density" of which the management controller information is "printer" in the set-value update information received from the server 110.

The printer-set-data management module 840 performs the update process of "settings.density" to the printer-set-value DB 870, and notifies the set-data management module 810 of the result. In this place, since the second controller 302 has already been in the non-energized state, the reflection process will fail. Accordingly, the control module 821 determines that the reflection process failed (NO in the step S1102), and finishes the set-value synchronization process concerning the second controller 302. That is, the control module 821 stops the set-value synchronization process concerning the second controller 302.

Thus, even if the power supply state of the controller varies before and after obtaining the set-value update information from the server 110 and the reflection of the set-value update information fails, the set-value update information after that is normally obtained in the second embodiment of the present invention.

Next, a multifunctional peripheral device as an information processing apparatus according to a third embodiment of the present invention will be described. It should be noted that configurations (hardware configurations and software configurations) of the multifunctional peripheral device and a server in the third embodiment are similar to the configurations of the multifunctional peripheral device and the server described in the first embodiment.

Figure 26A:
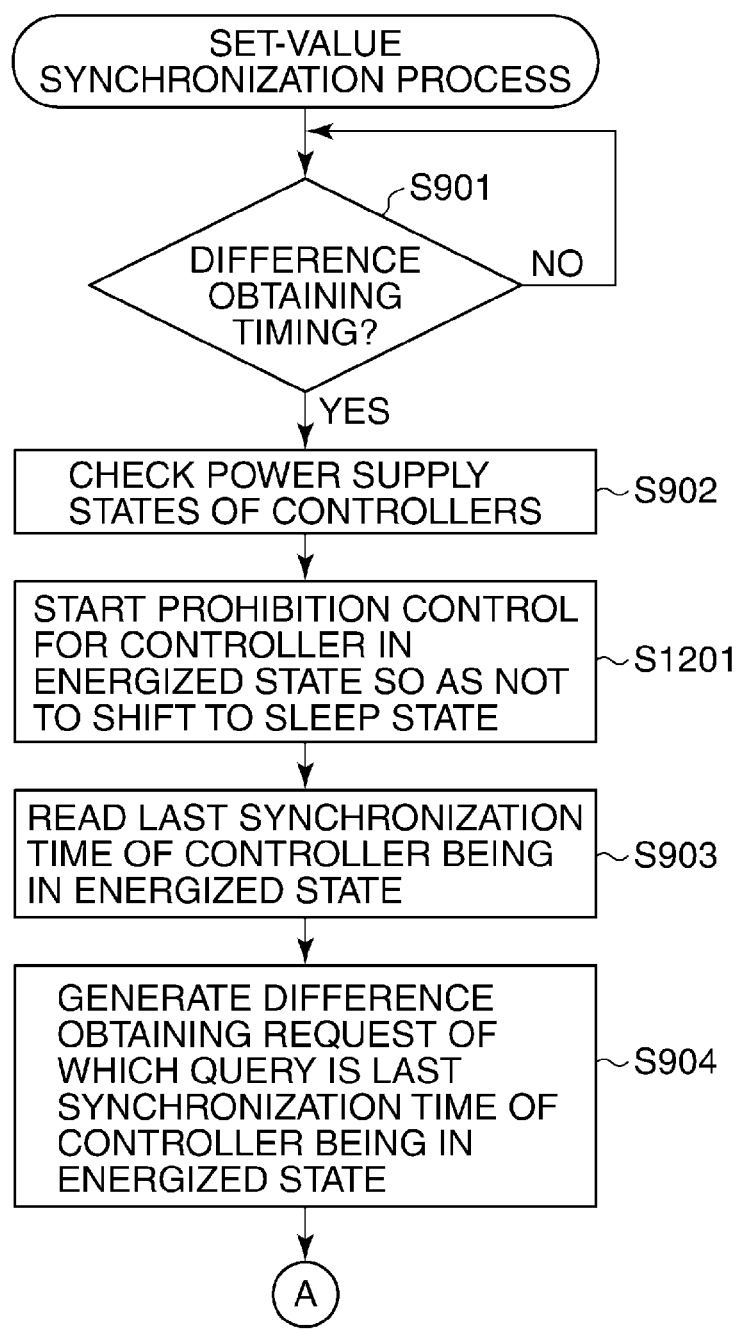
FIG. 26A and FIG. 26B are flowcharts for describing an example of a set-value synchronization process performed in a multifunctional peripheral device according to a third embodiment of the present invention.
Figure 26B:
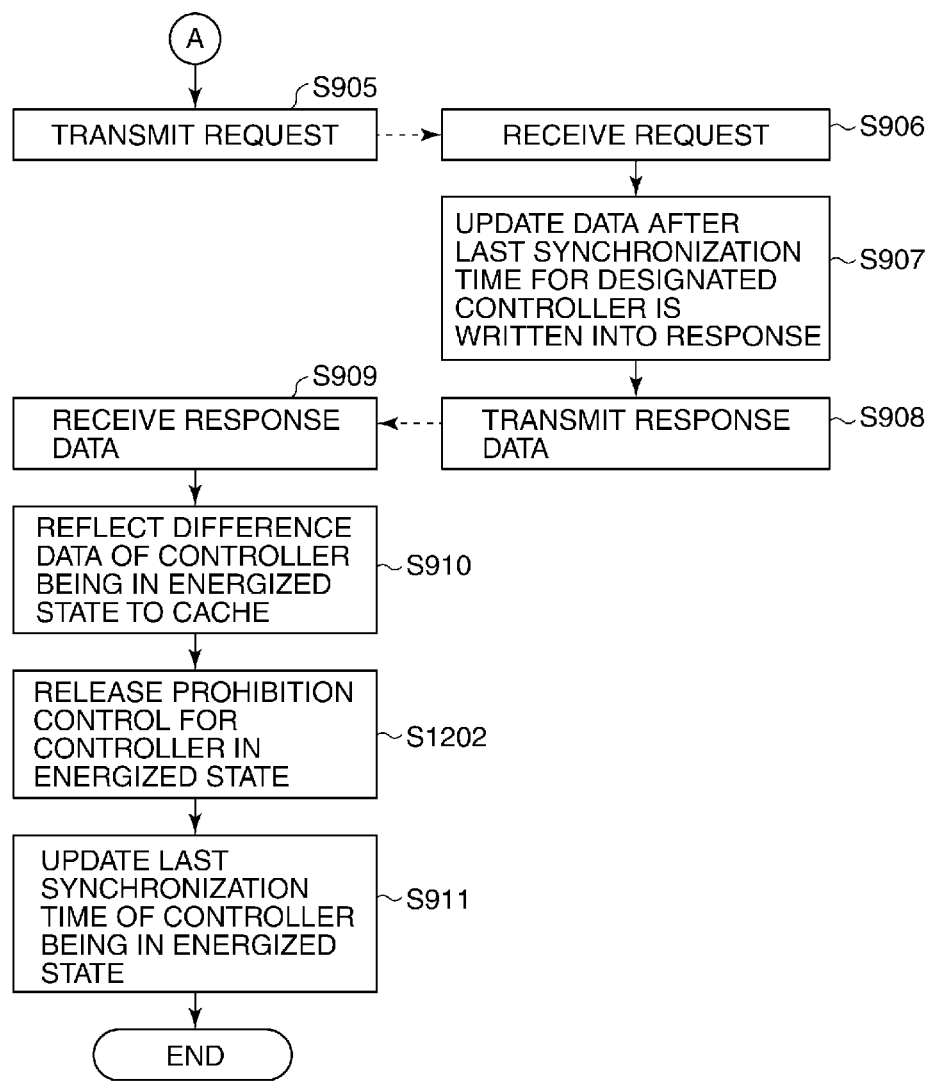

FIG. 26A and FIG. 26B are flowcharts for describing an example of a set-value synchronization process performed in the multifunctional peripheral device according to the third embodiment of the present invention. It should be noted that steps in the illustrated flowchart that are the same as the steps in the flowchart in FIG. 21 are indicated by the same reference numerals, and their descriptions are omitted.

In this place, the power supply states of the controllers shall be as shown in FIG. 19. The control module 821 checks the power supply states of the controllers in the process in the step S902. Then, the control module 821 requests the power supply management module 830 to prohibit the first controller 301 and second controller 302 in the energized state from shifting to the non-energized state. Receiving the request concerned, the power supply management module 830 controls the designated controller so as not to shift to the non-energized state (step S1201). When the shift prohibition control is performed, the target controller does not shift to the non-energized state until the control module 821 releases the prohibition of the shift to the non-energized state even when the condition to shift to the non-energized state is satisfied.

Subsequently, the process in the steps S903 through S910 is performed as described in FIG. 21. After that, when receiving the notification about success of the reflection process of the set-value update information from the set-data management module 810, the control module 821 requests the power supply management module 830 to release the prohibition of the shift to the non-energized state. The power supply management module 830 releases the prohibition of the shift to the non-energized state of the first controller 301 and second controller 302 (step S1202). Then, the power supply management module 830 notifies the control module 821 of the result. When receiving this notice, the control module 821 performs the process in the above-mentioned step S911, and finishes the set-value synchronization process.

Thus, when the set-value update information is received from the server 110, the controller in the energized state is prohibited from shifting to the non-energized state and the set-value update information is obtained in the third embodiment of the present invention. As a result of this, the power supply state of the controller in the energized state does not vary after transmitting the request, failure of the reflection process is certainly prevented.

As is clear from the above description, the communication control module 820 and the power supply management module 830 function as the determination unit, and the communication control module 820 and the set-data management module 810 function as the request unit in the example shown in FIG. 14 and FIG. 15. Moreover, the set-data management module 810, the printer-set-data management module 840, and the scanner-set-data management module 850 function as the update unit.

Furthermore, the set-data management module 810 and the communication control module 820 function as the transmission unit, and the set-data management module 810 and the power supply management module 830 function as the prohibition unit. Moreover, the set-data management module 710 functions as the generation unit, and the set-data management module 710 and the communication control module 720 function as the transmission unit.

Although the embodiments of the present invention have been described, the present invention is not limited to the above-mentioned embodiments, the present invention includes various modifications as long as the concept of the invention is not deviated.

Moreover, the functions of the above mentioned embodiments may be achieved as a control method that is executed by an information processing apparatus. Moreover, the functions of the above mentioned embodiments may be achieved as a control program that is executed by a computer with which the information processing apparatus is provided. It should be noted that the control program is recorded into a computer-readable storage medium, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-131173, filed Jun. 30, 2015, which is hereby incorporated by reference herein in its entirety.

What is claimed is:

1. An information processing apparatus comprising:
a plurality of devices including at least one image input device and at least one image output device, whose energization states are independently controllable, the plurality of devices configured to perform information processes according to set data;
a memory configured to store instructions; and
a processor configured to execute the instructions stored in the memory to:
determine an energization state of each device of the plurality of devices based at least on an energization state of a first controller, an energization state of a second controller that controls the image output device under the control of the first controller, and an energization state of a third controller that controls the image input device under the control of the first controller;
request update information about set data concerning at least one device of the plurality of devices that is controlled by a controller determined to be in an energized state from an external apparatus connected to the information processing apparatus through a network while not requesting update information about set data concerning one or more devices of the plurality of devices that are determined to be controlled by one or more controllers in a non-energized state; and
perform an update process that updates the set data of the at least one device of the plurality of devices that is controlled by the controller determined to be in an energized state according to the update information transmitted from the external apparatus in response to the request.

2. The information processing apparatus according to claim 1, wherein the processor is further configured to execute the instructions to transmit change data showing changed contents to the external apparatus when a user changes the set data.

3. The information processing apparatus according to claim 2, wherein the set data is set up about an item defined beforehand.

4. The information processing apparatus according to claim 1, wherein the update process for a device whose energization state is changed from an energized state to a non-energized state is stopped until the update information is received from the external apparatus after the request is transmitted.

5. The information processing apparatus according to claim 1, wherein the processor is further configured to execute the instructions to prohibit a device that is determined to be in the energized state from shifting to the non-energized state until the update process is finished after the request is transmitted.

6. The information processing apparatus according to claim 1, wherein requests are transmitted at predetermined intervals.

7. The information processing apparatus according to claim 1, wherein a time at which the update process is performed is saved into a memory as last update time, and
wherein update information that is later than the last update time is requested from the external apparatus.

8. The information processing apparatus according to claim 1, further comprising an image output device and an image input device, wherein whether the image output device is in the energized state is determined based on whether a controller that controls the image output device is in the energized state, and wherein whether the image input device is in the energized state is determined based on whether a controller that controls the image input device is in the energized state.

9. The information processing apparatus according to claim 1, wherein the information processes include an image process that forms an image according to image data.

10. An information processing system comprising:
an information processing apparatus that performs an information process according to set data, comprising:
a plurality of devices including at least one image input device and at least one image output device, whose energization states are independently controllable, the plurality of devices configured to perform information processes according to set data;
a first memory configured to store instructions; and
a first processor configured to execute the instructions stored in the first memory to:
determine an energization state of each device of the plurality of devices based at least on an energization state of a first controller, an energization state of a second controller that controls the image output device under the control of the first controller, and an energization state of a third controller that controls the image input device under the control of the first controller;
request update information about set data concerning at least one device of the plurality of devices that is controlled by a controller determined to be in an energized state from an external apparatus connected to the information processing apparatus through a network while not requesting update information about set data concerning one or more devices of the plurality of devices that are determined to be controlled by one or more controllers in a non-energized state; and
perform an update process that updates the set data of the at least one device of the plurality of devices that is controlled by the controller determined to be in an energized state according to the update information transmitted from the external apparatus in response to the request; and
an external apparatus that is connected to the information processing apparatus through a network and that saves the update information about the set data, comprising:
a second memory configured to store instructions; and
a second processor configured to execute the instructions stored in the second memory to:
generate the update information in response to the request; and
transmit the update information to the information processing apparatus as a response.

11. The information processing system according to claim 10,
wherein the set data is set up about an item defined beforehand, and
wherein whether the set data about the item is shared with another information processing apparatus is defined beforehand.

12. The information processing system according to claim 11, wherein the external apparatus transmits change data about the set data concerning the shared item to one information processing apparatus when the change data is received from another information processing apparatus.

13. A control method for an information processing apparatus, the control method comprising:
a determination step of determining whether each of a plurality of devices including at least one image input device and at least one image output device, whose energization states are controllable independently and that perform information processes according to set data, is in an energized state based at least on an energization state of a first controller, an energization state of a second controller that controls the image output device under the control of the first controller, and an energization state of a third controller that controls the image input device under the control of the first controller;
a request step of requesting update information about set data concerning at least one device of the plurality of devices that is controlled by a controller determined to be in the energized state in the determination step from an external apparatus connected to the information processing apparatus through a network while not requesting update information about set data concerning one or more devices of the plurality of devices that are determined to be controlled by one or more controllers in a non-energized state; and
an update step of updating the set data of the at least one device of the plurality of devices that is controlled by the controller determined to be in an energized state according to the update information transmitted from the external apparatus in response to the request.

14. A non-transitory computer-readable storage medium storing a control program causing a computer to execute a control method for an information processing apparatus, the control method comprising:
a determination step of determining an energization state of each device of a plurality of devices including at least one image input device and at least one image output device, whose energization states are independently controllable, based at least on an energization state of a first controller, an energization state of a second controller that controls the image output device under the control of the first controller, and an energization state of a third controller that controls the image input device under the control of the first controller, the plurality of devices configured to perform information processes according to set data;
a request step of requesting update information about set data concerning at least one device of the plurality of devices that is controlled by a controller determined to be in the energized state in the determination step from an external apparatus connected to the information processing apparatus through a network while not requesting update information about set data concerning one or more devices of the plurality of devices that are determined to be controlled by one or more controllers in a non-energized state; and
an update step of updating the set data of the at least one device of the plurality of devices that is controlled by the controller determined to be in an energized state according to the update information transmitted from the external apparatus in response to the request.

* * * * *